United States Patent
Bhatia et al.

(10) Patent No.: US 7,416,129 B2
(45) Date of Patent: *Aug. 26, 2008

(54) MOBILE TERMINAL WITH ERGONOMIC HOUSING

(75) Inventors: Sudhir Bhatia, Brooklyn, NY (US); Alistair Hamilton, Stony Brook, NY (US); Jaeho Choi, Whitestone, NY (US); Curt Croley, Stony Brook, NY (US); Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,031

(22) Filed: Mar. 19, 2007

(65) Prior Publication Data

US 2007/0158429 A1    Jul. 12, 2007

Related U.S. Application Data

(63) Continuation of application No. 10/625,268, filed on Jul. 23, 2003, now Pat. No. 7,195,169.

(51) Int. Cl.
*G06K 7/10* (2006.01)
(52) U.S. Cl. ............... 235/472.01; 235/462.45
(58) Field of Classification Search ........... 235/472.01, 235/472.02, 462.44–462.49
See application file for complete search history.

(56) References Cited

U.S. PATENT DOCUMENTS

| | | | |
|---|---|---|---|
| 3,774,009 A | 11/1973 | Hodges | |
| 4,228,794 A | 10/1980 | Boller | |
| 4,387,297 A | 6/1983 | Swartz et al. | |
| 4,496,831 A | 1/1985 | Swartz et al. | |
| 4,538,072 A | 8/1985 | Immier et al. | |
| 4,593,186 A | 6/1986 | Swartz et al. | |
| 5,023,824 A | 6/1991 | Chadima et al. | |
| 5,067,573 A | 11/1991 | Uchida | |
| 5,168,145 A | 12/1992 | Tackett et al. | |
| 5,198,651 A | 3/1993 | Barkan et al. | |
| 5,410,141 A | 4/1995 | Koenck et al. | |
| 5,422,442 A | 6/1995 | Gouda et al. | |
| 5,468,952 A | 11/1995 | Alexander et al. | |
| 5,488,575 A | 1/1996 | Danielson et al. | |
| 5,600,121 A | 2/1997 | Kahn et al. | |
| 5,612,720 A | 3/1997 | Ito et al. | |
| 5,657,201 A | 8/1997 | Kochis | |
| 5,703,626 A | 12/1997 | Itoh et al. | |
| 5,736,726 A | 4/1998 | VanHorn et al. | |

(Continued)

*Primary Examiner*—Daniel St.Cyr
(74) *Attorney, Agent, or Firm*—Amin, Turocy & Calvin, LLP

(57) ABSTRACT

Systems and methods are disclosed for employing a housing as part of a hand held scanner as to increase utility and add ruggedness. The housing comprises an upper top housing and lower bottom housing, with the top housing comprising a set of accessory rails adapted to accept accessories associated with the hand hold scanner, and the lower housing including an adjustable mass element for balancing a weight of the scanner. Also, top housing can be adapted to accept various key pad configurations via a transitional mounting frame, and the bottom housing can hold a stylus. A bar code scanner system employing such housing can incorporate displays located on various sides of the housing and/or key pads to facilitate a reading from the scanner at slanted angles.

19 Claims, 12 Drawing Sheets

U.S. PATENT DOCUMENTS

| | | | |
|---|---|---|---|
| 5,744,791 A | 4/1998 | Isaac et al. | |
| 5,763,864 A | 6/1998 | O'Hagan et al. | |
| 5,801,371 A | 9/1998 | Kahn et al. | |
| 5,969,328 A * | 10/1999 | Kunert | 235/472.01 |
| 6,036,098 A | 3/2000 | Goldman et al. | |
| 6,065,679 A | 5/2000 | Levie et al. | |
| 6,068,307 A | 5/2000 | Murphy | |
| 6,109,528 A | 8/2000 | Kunert et al. | |
| 6,112,993 A | 9/2000 | Svetal et al. | |
| 6,170,748 B1 | 1/2001 | Hash et al. | |
| 6,394,355 B1 | 5/2002 | Schlieffers et al. | |
| 6,410,865 B1 | 6/2002 | Liu et al. | |
| 6,415,982 B2 | 7/2002 | Bridgelall et al. | |
| 6,495,784 B2 | 12/2002 | Yoon et al. | |
| 6,497,368 B1 | 12/2002 | Friend et al. | |
| 6,708,883 B2 | 3/2004 | Krichever | |
| 6,722,569 B2 | 4/2004 | Erhart et al. | |
| 6,822,853 B2 * | 11/2004 | Wulff et al. | 361/680 |
| 7,064,745 B2 | 6/2006 | Kim | |
| 7,069,061 B2 | 6/2006 | Gammon et al. | |
| 7,195,169 B2 * | 3/2007 | Bhatia et al. | 235/472.01 |
| 2001/0042681 A1 | 11/2001 | Yoon et al. | |
| 2004/0204132 A1 | 10/2004 | Idani et al. | |
| 2005/0011951 A1 | 1/2005 | Chang et al. | |
| 2006/0019765 A1 | 1/2006 | Plutt | |

* cited by examiner

MOBILE TERMINAL WITH ERGONOMIC HOUSING

CROSS-REFERENCE TO RELATED APPLICATIONS

This application is a continuation of U.S. patent application Ser. No. 10/625,268, filed Jul. 23, 2003, entitled "MOBILE TERMINAL WITH ERGONOMIC HOUSING", the entirety of which is incorporated herein by reference.

FIELD OF THE INVENTION

The invention described below generally relates to a housing for an electronic unit and in particular to an ergonomic housing for a terminal scanner with added utilities.

BACKGROUND OF THE INVENTION

Portable hand-held terminals are employed in many different industries, and are typically assembled by enclosing internal electrical components within a housing. Generally, a desirable characteristic of such terminals is that they can readily function, while a respective user performs other more demanding tasks. For example, a user may find it necessary to operate a data terminal with one hand, while leaving the other hand free. In particular, the user may find it desirable to lift or otherwise shift small items of inventory with one hand, while simultaneously scanning them with the portable scanner held in the other hand.

Typically, a data terminal equipped with an optical character set reader is coupled with a handle assembly for ease of gripping by a user. The handle grip assembly further includes a trigger mechanism that is connected to the data terminal so that the user, by depressing the trigger, command the data terminal's optical character set reader to scan a target, e.g., bar code symbols. Upon depressing the trigger, a laser beam generated by a laser source, for example, a gas laser tube or a semiconductor laser diode, is optically focused by an optical train into a generally circular laser beam spot on a target symbol. The beam spot is swept by a scanning component over the symbol and forms a scan pattern thereon. Laser light reflected off the symbol is detected by a light sensor, e.g. a photodiode, which is mounted together with the laser source and the optical train in the terminal unit.

The symbol itself is a coded pattern comprised of a series of bars of various widths. The bars are being spaced apart from one another to bound spaces of various widths and the bars and spaces have different light-reflective properties. Although dimensions may vary, depending on the particular application and the density of the symbol, each bar and space of a bar code symbol typically used in the retail industry to identify retail products measures on the order of thousandths of an inch (mils). In practice, the generally circular laser beam spot has a cross-sectional diameter on the order of 6 to 10 mils. Such bar code symbols are widely used for a multitude of applications, for example sales order entry, inventory control, marketing data collection, asset management, and the like. In particular, the use of bar codes has become so common they are now typically found on store shelves and on packages, containers, cans, and the like in which merchandise is packaged and sold. As a consequence, a variety of bar code scanners for reading and decoding bar codes are manufactured and marketed.

Generally, bar code scanners fall within one of two types, namely; laser scanners and contact scanners. A laser scanner can resemble a "gun" in that it generally has a brick or bar shaped element and a handle with a trigger. This design aids a user in aiming the laser scanner properly at the target, as well as controlling and balancing the laser scanner which, due to its weight, can cause fatigue in the hands and wrists of a user.

By aiming the brick shaped element of the scanner in a direction of a code symbol and pressing the trigger, a laser scanner scans or "reads" a bar code. As such, the laser source emits a light beam that exits the brick shaped element of the laser scanner and strikes the bar code. Subsequently, a portion of the light beam is reflected back through the brick element in such a manner as to strike a detector, which then transmits the information electronically for further processing, e.g., to a microprocessor.

The second type of scanners, contact scanners are sometimes also referred to as "pencil wands" due to their narrow, pencil-like shape. Contact scanners scan or "read" a bar code by emitting visible red or infrared light such as, for example, from an LED which strikes the bar code while the scanner is moved across the bar code in a linear direction with the tip of the scanner touching the bar code label. Similar to a laser scanner, a portion of the light is reflected back into the wand in such a manner as to strike a detector which then transmits the information electronically for further processing.

Traditionally, laser scanners and contact scanners were generally simple devices that included only the requisite optics. Such scanners could be connected via a cable to a separate computer and an operator viewed the requisite data on a display of the computer and employed the computer key board to input any data. As such, the scanners did not include a keyboard, a display, or a memory.

However, more recent versions of such bar code readers have included some form of a keypad, a display, a CPU and a memory, for example a wireless laser scanner that incorporates an internal battery and memory to save the data as the operator scans bar codes has been introduced. Moreover, many such bar scanners employ various accessories for different types of applications. The constant adding and replacing of the required accessories cause wear and tear in the body of the hand held scanner that is generally formed from plastic or rubber. Such abrasion of the plastic body shortens a life cycle of the portable scanner. At the same time, wrapping the accessories around the body of the scanner reduces a user's grip balance and ease of use, causing early fatigue for a user. Moreover, often the hand held scanner needs to be oriented at various angles for a proper reading of the bar code symbol display. At such slanted angles, it is typically difficult for a user to readily observe the display area window of the scanner, should a reading becomes necessary during the use of the hand held scanner.

In addition, many such scanners are generally designed for employing a specific key pad configuration and are not adapted to employ key pads with wider configurations than the width of the scanner. Thus, their flexibility of use is limited.

Therefore, there is a need to overcome the aforementioned deficiencies associated with conventional scanning devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides methods and systems for employing a terminal housing as part of a portable scanner unit as to increase utility and add ruggedness. According to one aspect of the present invention, the terminal housing comprises an upper top housing and a lower bottom housing. The top housing includes a set of accessory rails adapted to accept accessories associated with the scanner device. By providing such a durable interface between the terminal housing and the accessory, tear and wear associated with inserting and withdrawing of the accessories into and out off the terminal housing is mitigated. In one aspect of the present invention, the accessory rails can be positioned on opposite sides of an accessory compartment within the terminal housing.

The top housing can further comprise a battery compartment with a battery release mechanism for receiving a battery. By placing the battery compartment in the top housing according to the present invention, a unique design may be achieved that facilitates battery replacement, while freeing up handle space of the lower housing, which in turn can be exploited for additional utility, e.g. housing a stylus.

According to one aspect of the present invention the accessory railing assembly provides for an increased utility of the terminal housing by enabling incorporation of various accessories that at first appear to be incompatible with the electrical unit due to size limitations. For example, according to one aspect of the present invention, a hand held scanner can be adapted to incorporate wide key pads that initially seemed over sized for the portable scanner. Accordingly, various oversized key pads, in addition to other suitable keypads can be readily mounted on a portable bar code scanner of the present invention. In another aspect of the present invention, the various over sized keypads can be incorporated into the scanner by employing a transitional mounting frame that engages on the top housing and accepts the over sized key pad. An example of such oversized key pad can be a key pad having a wider width or length than that of the top housing.

Another aspect of the present invention provides for various display units placed on a side(s) of the key pad, and/or the terminal housing. Such display units function as an additional side screen to facilitate a reading associated with the scanner. Moreover, an LED(s) that is activated upon a particular key being depressed, can be provided as part of the scanner's key pad. Such an LED assembly functions as a visual indicator signifying to a user whether a specific key, e.g. a function key, on the key pad has been depressed. In particular, pressing a particular key may place the electronic unit in a specific mode, or activate a particular function, which if the user is not alerted to, can dumbfound a user while employing the electronic unit. The visual indicator can be a change of color or brightness of the key pad's LED(s). Other audio alert features may also be employed. The key pad, as well as the upper housing, can further include various surfaces that function as a resting area for the user's finger, hand or wrist.

In one aspect of the present invention, the lower housing comprises a neck grip curve as part of its lobster tail shaped handle. Such neck grip curve can initiate on an opposite side of a scan trigger forming a raised projection of rubber protruding out from the handle. This feature enables a user to hold a strong grip on the handle, for example when a user's finger presses against the trigger. Accordingly, the user has a firm grip on the unit, and possible sliding difficulties, e.g. due to sweat on a user's palm, can be mitigated. The neck grip curve can also be employed as a finger rest by placing a finger thereupon and relieving a working stress from finger joints of a user, thus reducing a user's fatigue.

In another aspect of the present invention, the lower housing comprises a counter weight as to move downward a center of gravity, and increase an over all balance of the unit when held by a user. Moreover, a user can adjust a position of the counterweight within a specified limit to provide for additional ease of application according to the user's preference. The lower housing can further comprise a compartment for placing a stylus associated with the electronic unit in accordance with another aspect of the present invention. The stylus can be positioned within the handle and substantially parallel to it. Sculpted ribs can be provided on inner sides of the compartment for the stylus as to facilitate guiding the stylus within it. In one aspect of the subject invention, the stylus can maintain its position within the handle compartment by leveraging against the counterweight.

In another aspect of the present invention, the handle of the terminal housing is covered by an external shock isolation assembly. Such external isolation permits for a suitable selection of bumper configurations depending on the severity of the environment. The shock isolation assembly for the handle includes a rubber mounting employing a groove that provides for an additional collapse and deformation of the rubber on itself during impact.

According to another aspect of the present invention, a hand held scanner employing the housing terminal emits a laser beam at an angle designed to readily scan and read the target bar code.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

Figure 1:
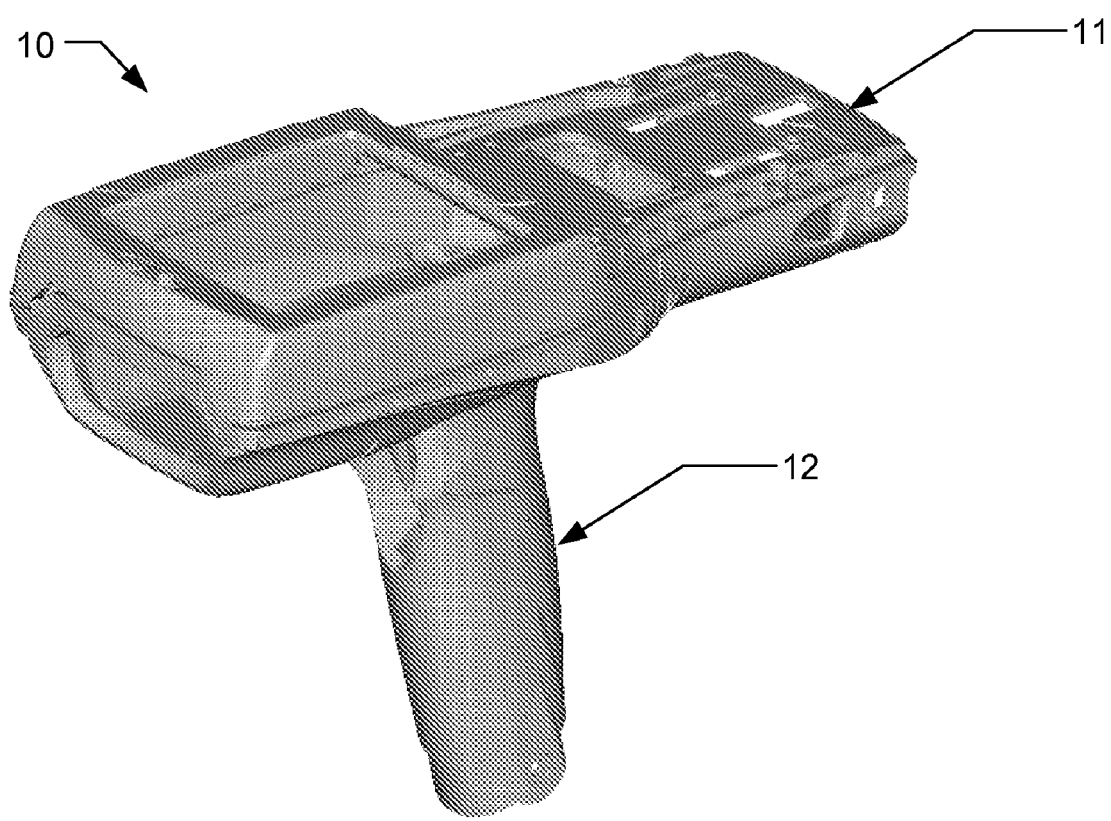
FIG. 1 illustrates a perspective view of a hand held mobile terminal housing in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring initially to FIG. 1, a terminal housing assembly according to one aspect of the present invention is illustrated. The illustrated housing assembly can be applied for containment of an electronic device, such as devices employed in numerous types of commercial and industrial applications (e.g., a bar code reader unit, code scanner unit, laser and/or light emitter unit, data storage instrument, computers, personal digital assistants, communication units and the like), which are typically assembled by enclosing internal electrical components, such as a Central Processing Unit (CPU) board, display, and internal wiring, within the housing assembly. The housing is configured to be held in the palm of one hand with the keys on a subsequently mounted keypad (not shown) engageable by the thumb or fingers of the hand holding the housing, or by the other hand. The hand held portable terminal 10 has an elongated bar encapsulation shape 11 being mounted upon a handle 12, and is formed via a top housing assembled to a bottom housing. Typically, materials employed for fabricating the housing 10 can include various types of thermoset plastic or thermo plastic material, and the like. The housing 10 may also include a hand strap (not shown) for user comfort. The hand strap can mount the housing 10 on the back of the operator's hand by passing over a user's knuckle, so that the scanner apparatus can be operated with ease. The hand strap can be connected to the body of the terminal 10 at various points for example the lower handle or the sides.

Figure 2:
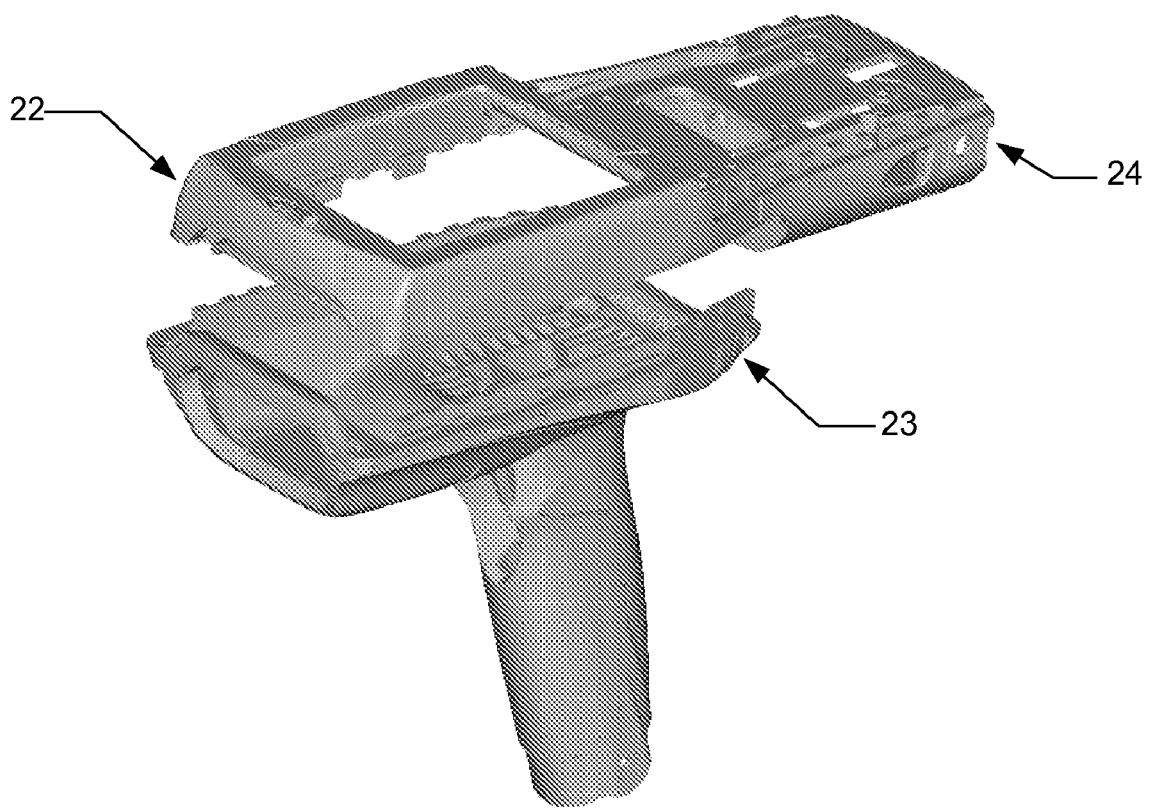
FIG. 2 illustrates a perspective view of the top housing and the bottom housing prior to assembly.

FIG. 2 illustrates a perspective view of the top housing 22 and the bottom housing 23 before assembly. The top housing 22 can include various microphone ports, audio jack sockets, various interface feature for information transfer, such as serial communication ports for different communication standard and/or protocol, e.g., parallel, SCSI, Firewire (IEEE 1394), Ethernet, etc.

Moreover, the top housing 22 includes mounted rails for accepting accessories, as well as a compartment for a battery pack mechanism and release assembly 24 that is located at a rear end of the bar shaped elongated encapsulation. By placing the battery compartment in the top housing, according to one aspect of the present invention, a unique design may be achieved that facilitates battery replacement, while freeing up handle space that can be exploited for additional utility, e.g., a stylus compartment. Moreover, a more flexible weight distribution scheme can be obtained, thus facilitating a user's balanced grip for the scanner unit. The battery pack compartment 24 can employ various types of latching mechanisms to assemble a battery with the host scanner device. For example, a simple plastic cantilever latch can be employed that comprises a cantilever or beam which is anchored at one end and carries a latch element at the opposite end. The cantilever or beam is deflected in order to engage or disengage the latch. Alternatively, or in combination with the cantilever latch spring-loaded cam latches can be employed. Such latch mechanisms provide for a metal leaf spring or coil spring that urges a latch member to an engaged position. The latch member generally includes a camming surface which is engaged by an actuator element to move the latch member to a disengaged position.

Moreover, various gaskets (not shown) can be provided along a perimeter of the top housing for any opening (e.g., a display, interconnect point, and the like) to mitigate contamination, which might otherwise enter the electronic device assembly from outside and thus affect performance of the unit. The gaskets can be of rubber, foam, or any other elastomer, operable to sufficiently seal the assembly of the mobile terminal.

Figure 3:
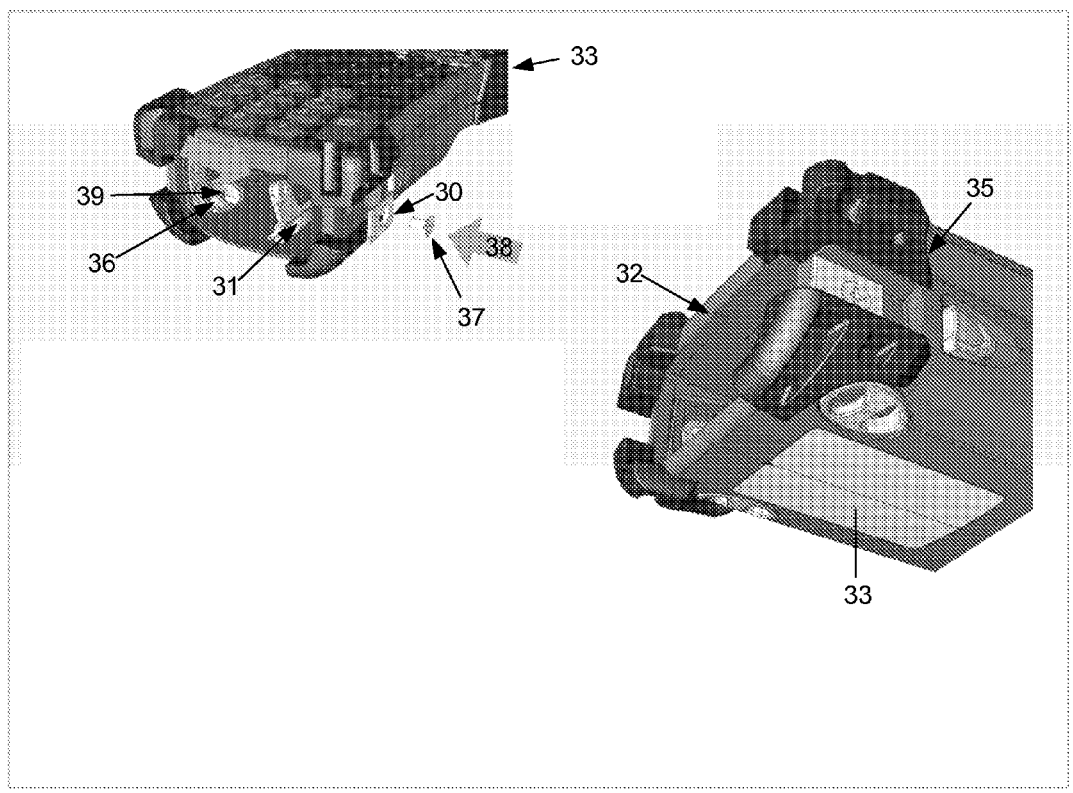
FIG. 3 illustrates an accessory rail interface as part of the top housing according to one aspect of the present invention.

Referring now to FIG. 3 an accessory rail interface 31, which is part of the top housing 33 is illustrated in accordance with an aspect of the present invention. An accessory (not shown) for the electronic device can be mounted via a mounting part 36 onto the support rail assembly 31, and then slid into the accessory compartment 32. Each support rail mounting assembly comprises a rail with guided posts and/or raised brackets with a locking part 39 for engaging an accessory there upon. It is to be appreciated that other snap and catch release mechanisms that employ various engaging mechanism, such as spring assemblies and the like can also be employed as part of the railing assembly and/or mounting/locking to securely seize the accessory in its compartment.

The rail supports 31 run substantially parallel to the side walls 35 of the compartment, and convey the pressure exerted by the accessory to the elastic wall(s) 35 on which the rail frame 31 is buttressed. The rail supports 31 can be in from of a channel section member, or any suitable tapered cross section, and can be fabricated from any resilient material, (such as various metals, highly durable plastics or the like). Accordingly, such members can be readily replaced at a low cost if worn out. A single screw 37 clamps together the rail frame 31 to the side wall 35, as well as clamping the sidewall 35 to a metal strap part 30, in the direction of the arrow 38. In other words, a portion of the side wall 35 is being sandwiched between the metal strap part 30 and the rail frame.

Accordingly, the rail interface 31 provides a physical interface between the accessory (not shown) and the plastic side wall member(s) 35. Thus, abrasion of the plastic side wall member(s) 35 that typically occurs from a regular adding or removing of the accessory is mitigated. Moreover, such design provide for a more flexible accessorization, as compared to designs that merely add on an accessory by wrapping it around the electronic unit.

Figure 4:
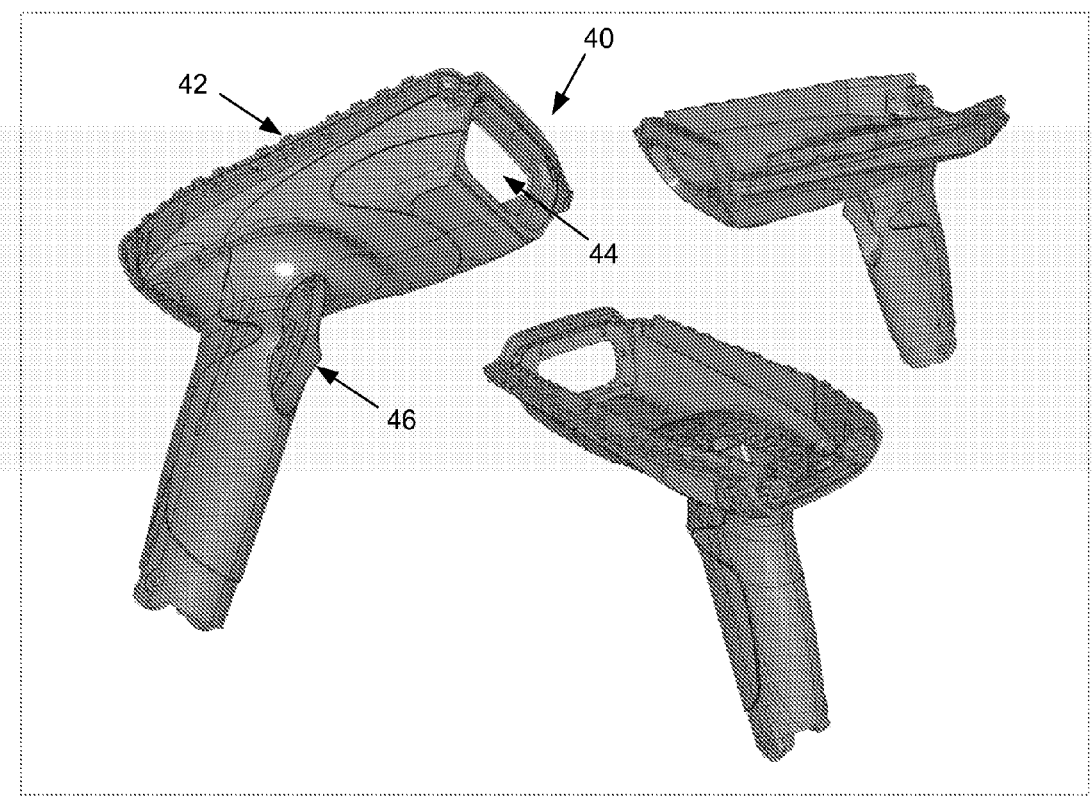
FIG. 4 illustrates perspective views of the bottom housing in accordance with an aspect of the present invention.

FIG. 4 illustrates other perspective views of the bottom housing 40, according to one aspect of the present invention. The bottom housing 40 can have connecting structures 42 in the form of various latching mechanism employed to assemble the lower housing with the upper housing. A plurality of such interlocking joints 42 can be spread around the perimeter of the connecting area of the lower housing 40 and/or the upper housing. Typically, such interlocking mechanism is designed to minimize its occupied volume, while at the same time providing a secure attachment to prevent disengagement from the upper housing. The bottom housing 40 further includes an opening 44 that functions as a reading window for a subsequent scanning reader unit (not shown) mounted thereupon. The user aims the window 44 at a desired indicia to be read and presses the trigger 46 that activates the reader unit. A display unit (not shown) can be employed to display information relating to a mode of operation of the electronic unit, or display check information relating to an item being read by an optical scanner (not shown) located in the electronic unit.

Figure 5:
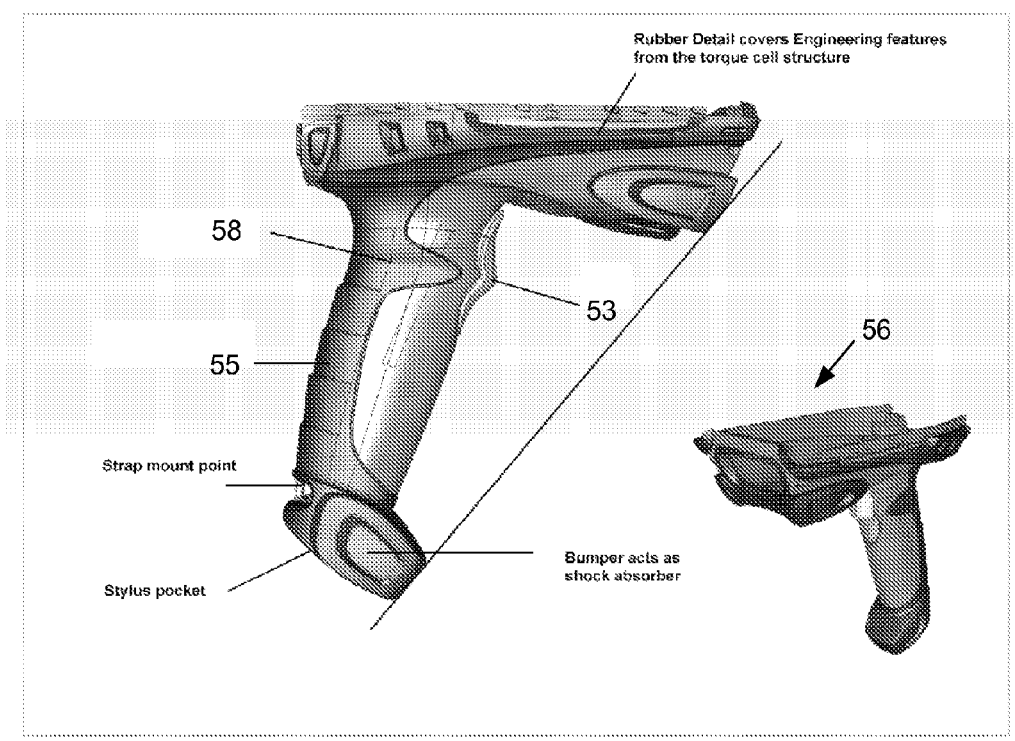
FIG. 5 illustrates a more detailed perspective of the bottom housing according to an aspect of the present invention.

FIG. 5 illustrates a more detailed perspective of the bottom housing in accordance with an aspect of the present invention. The bottom housing 56 comprises a handle 55 that has a lobster tail configuration, a trigger 53 and a neck grip curve 58 positioned on a back side of the handle 55 and opposite the trigger 53. Trigger 53 is ergonomically designed and substantially conforms to contours of a grip portion of handle 55 when depressed by the user, and thereby ensures reduced discomfort in the gripping and actuating and deactuating modes of the portable scanner. Additionally, trigger 53 can have an integrally molded body with a mounting portion received through an opening in an upper portion of handle 55. As such, trigger 53 can be pivotally mounted in handle 55 under spring bias. Sides of trigger 53 are contoured to conform to contours of the grip section, when trigger 53 is depressed by a user, so as to actuate scanning and reading modes for a reader unit (not shown) of the scanner device. Alternatively, trigger 53 can be molded as part of handle 55 in one stage.

In one exemplary aspect of the present invention, the neck grip curve feature 58 is a raised rubber pump protruding laterally from the handle 55. Such raised rubber projection feature 58 can be fabricated as part of an over mold process, as opposed to being fabricated directly out of a straight plastic sheet. Accordingly, stress concentration accumulation in various stress points of the curve can be mitigated. Moreover, positioning neck grip curve 58 on an opposite side of scan trigger 53, enables a user to maintain a stronger grip on the handle upon a user's finger pressing against the trigger 53. Thus, gripping difficulties associated with sliding of the handle 55, e.g. due to sweat on a user's palm, can be mitigated. The neck grip curve 58 can also function as a finger rest by placing a finger thereupon and relieving a working stress on finger joints. Such design reduces a user's fatigue during long hours of employing the scanner unit.

Figures 6A, 6B:
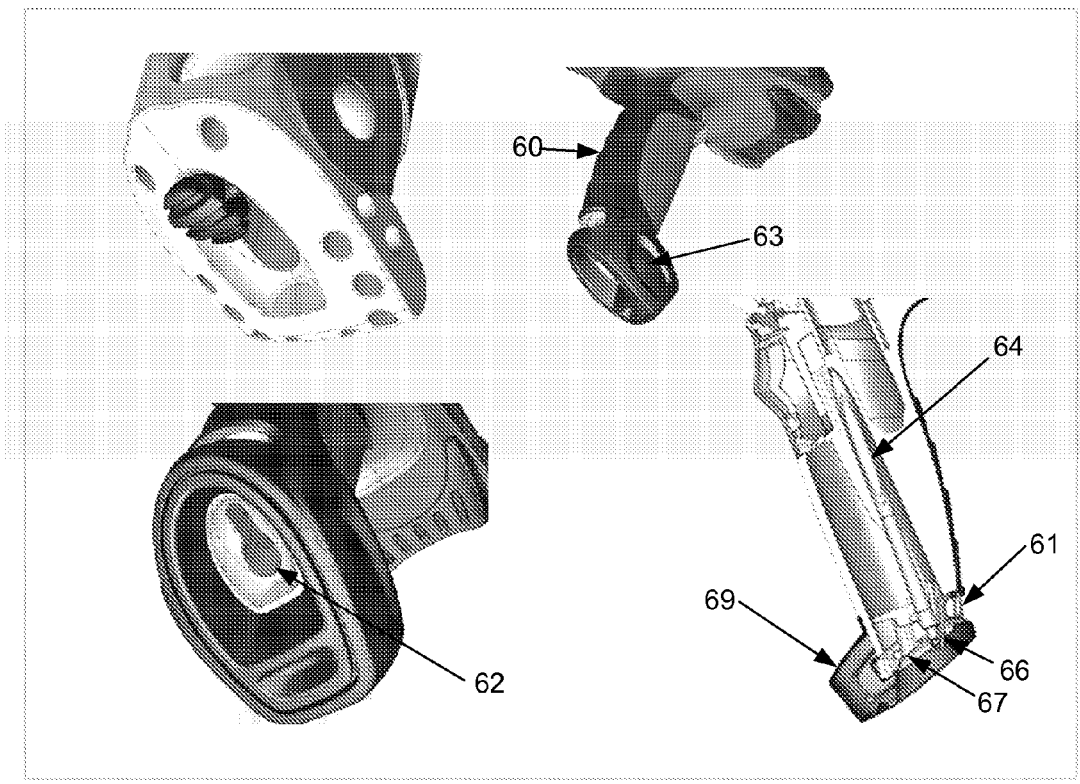
FIGS. 6a and 6b illustrate a perspective and cross section of the handle for the bottom housing according to one aspect of the present invention.

Referring now to FIGS. 6a and 6b a detailed perspective and cross section of the handle according to one aspect of the present invention is illustrated. The handle 60 comprises a cavity 62 for accommodating a stylus 64 therein. The inner walls of the cavity 62 can include sculpted ribs that function as a mechanism for guiding the stylus 64 during insertion into the cavity 62. FIG. 6b shows a cross section of the handle with the stylus 64 placed in the handle substantially parallel thereto. The stylus 64 can be engaged in the cavity via a spring locking mechanism or any other suitable securing assembly 67.

In another aspect of the present invention, the stylus can also be engaged in place via leveraging against a mass 66 placed as part of handle 60 for the lower housing. Since the battery is relocated to the top housing, the weight of the mass 66 acts as a force to lower the center of gravity for the scanner unit. Such weight distribution increases an over all balance of the unit when held by a user. The mass 66 can be on or about 75 grams and can be formed from a metal material. Moreover, the mass 66 can also act as an attachment feature for a strap connected at strap point 61, thus allowing added flexibility for a carrying or hanging of the electronic unit. Moreover, a user may adjust a position of the mass 66 within specified limits, thus balance tuning a hand held grip on the unit as to create a more comfortable feel.

According to another aspect of the present invention, the handle 60 is being over molded by rubber material to create a shock absorber 69 that acts as a soft cushion in an event of a drop. The shock absorber 69 can comprise various grooves 63 around the perimeter as to allow the shock absorber to further collapse on itself and diffuse the shock energy in case of a drop.

Figure 7:
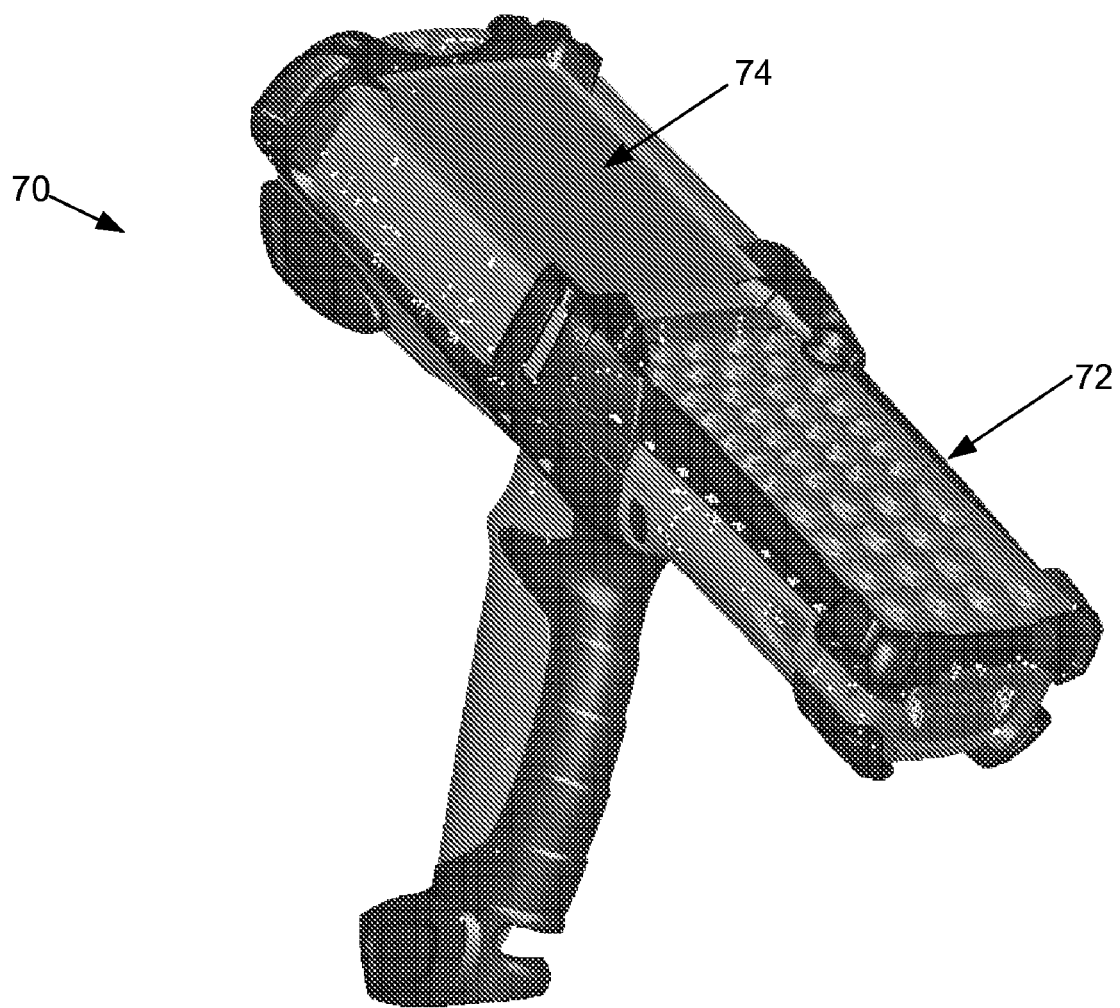
FIG. 7 illustrates one particular hand held scanner employing a housing according to the present invention.

Referring now to FIG. 7, an exemplary hand held scanner is illustrated that employs a housing according to the present invention. The scanner 70 includes a display 74 for displaying information. The display 74 can be a touch screen and may employ capacitive, resistive touch, infrared, surface acoustic wave, or grounded acoustic wave technology. Further, the display 74 can be a liquid crystal device, cathode ray tube (CRT), field emission device (FED, also called flat panel CRT) or any other display device suitable for creating graphic images and alphanumeric characters recognizable to the user. Terminal 70 further includes a user interface keypad 72 to enter information concerning modes of operation of the mobile terminal or to carry out cancellation or manipulation operations on information provided by the terminal. The keypad 72 consists of electrometric keys that are positioned within a central portion of a top surface for the upper housing.

As shown, the portable bar code scanner 70 is configured to be held with the palm of a user's hand, and various keys on its keypad 72 can be engaged by thumb or fingers of the hand holding the housing. The bar code scanner 70 can be employed in a wireless communication network for tracking inventory, storing data, etc. No cables are required to connect the scanner apparatus to a computer device, thereby further reducing its weight and consequent fatigue, and eliminating the inefficiencies caused by entanglement with such cables. Moreover, its size allows easy access to difficult scanning locations. The scanner 70 provides rapid key entry and reading of displayed information, providing the operator with real time data so that decisions and actions can be quickly implemented. A user may input and/or process data via keypad, scanner element, etc. independent of the hand-held terminal 70 being connected to a communication network, for example a LAN or a WAN. When hand-held terminal 70 does not include a transceiver to provide for real time communications, the data can be stored in memory within the hand-held terminal 70. Accordingly, should the hand-held terminal 70 subsequently be connected to a network, stored data can be downloaded to a host computer (not shown).

Figure 8:
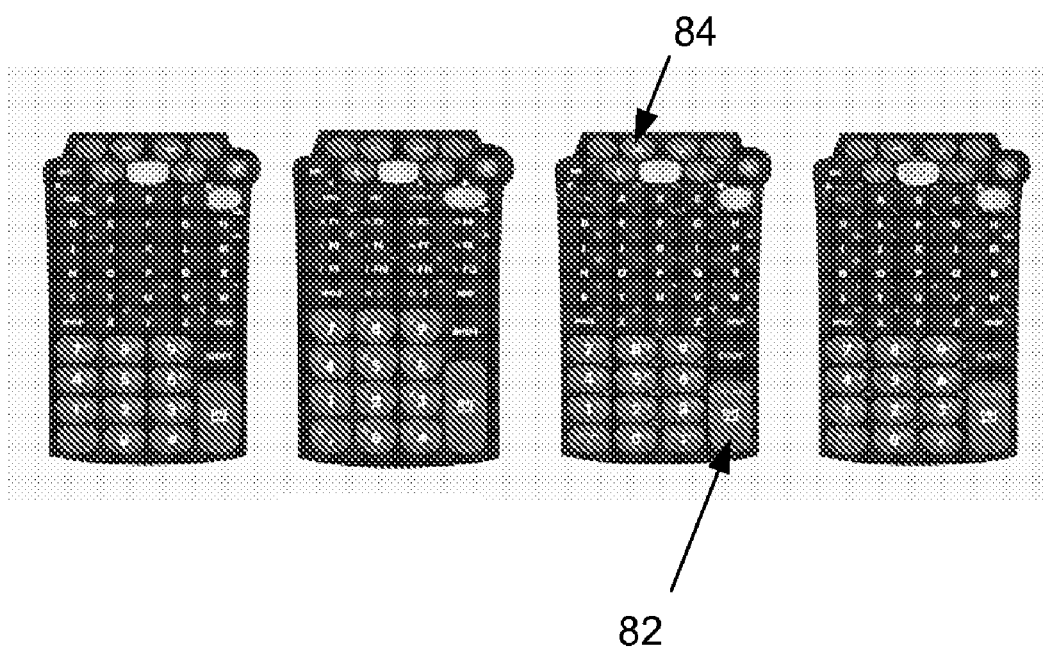
FIG. 8 illustrates various key pad designs that can be incorporated as part of the terminal housing according to one aspect of the present invention.

FIG. 8 illustrates various key pad designs that can be incorporated as part of the terminal housing according to one aspect of the present invention. The key pad layouts have a general resemblance in that for example, all enter keys 82 are located on the lower hand side, as well as the navigation tool keys 84 being located on the upper mid section. The key pad surface can further include an area(s) that function as a resting area for the user's fingers, hands or wrist. Each key can have a domed upper surface for optimum thumb tangency, and the individual keys are sufficiently spaced apart so as not to interfere with actuating any one key. Entering variable data into the scanner apparatus is similar to operating a calculator.

Figure 9:
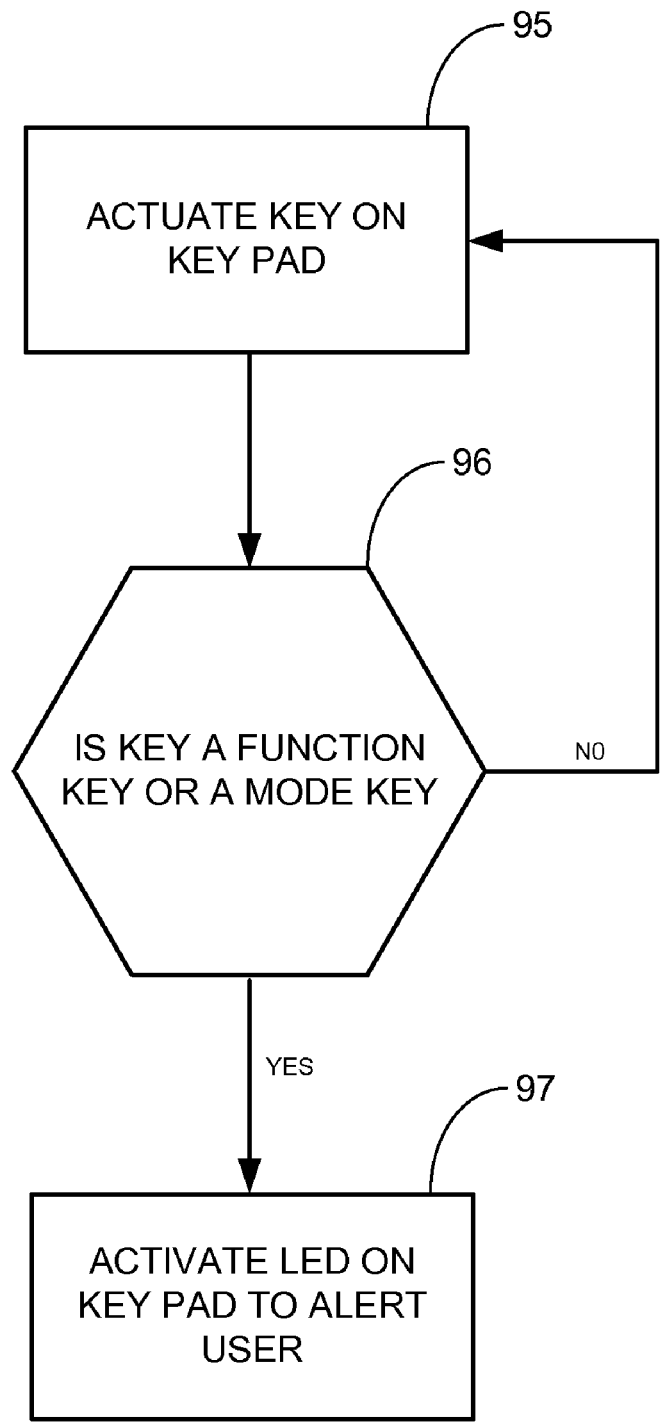
FIG. 9 illustrates an exemplary flow chart for alerting a user by illuminating a scanner's key pad.

In one aspect according to the present invention, a portion of the keypad is illuminated, if a specific key(s) is being actuated. For example, if during operation a key that changes an operation mode for the unit is being pressed, then a portion of the key pad illuminates via LED(s), as to alert a user of the selected mode of operation. By observing the illuminating color or brightness on the keypad surface, a user can readily ascertain the mode selected for the unit and prepare accordingly. FIG. 9 illustrates an exemplary flow chart for alerting a user according to the present invention. At 95 a user of the scanner unit strokes a key on the key pad. Such actuation can be deliberate or as a result of an accidental contact of the key pad with an external stimulus. Thereafter, at 96 it is decided whether the depressed unit, for example, alters a mode and/or a function of the scanner unit. Actuation of such keys, for example, can change a keypad's alphanumerical designations that a user routinely applies and is accustomed to. Moreover, pressing such keys can initiate a particular mode for the scanner. Accordingly, a user may be dumbfounded if not alerted to such alterations in the function of the scanner and/or key pad. To mitigate such ambiguity, at 96 the key pad provides a visual notification by illuminating a certain color or brightness on the key pad surface. In another aspect of the present invention, various audio heralds, alone or in combination with the visual alerts can be employed for alerting a user that a particular key has been actuated.

Figure 10:
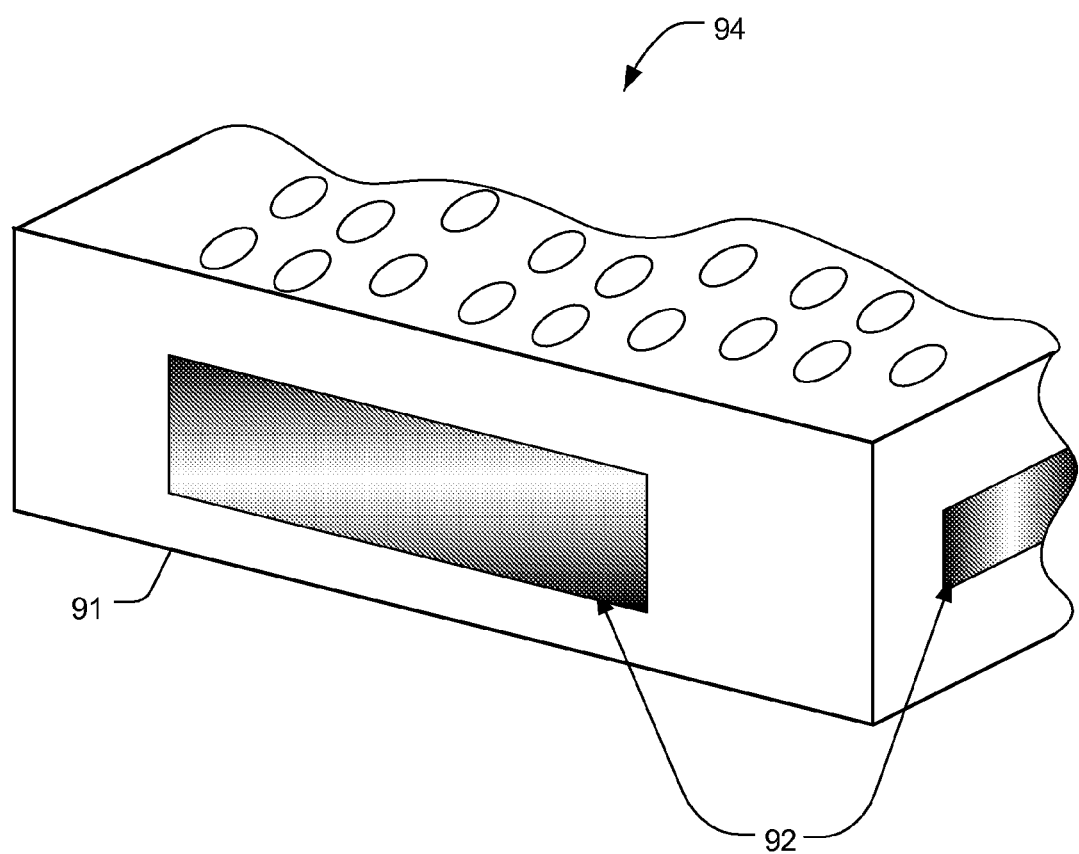
FIG. 10 illustrates a keypad configuration according to one aspect of the present invention wherein additional display elements having various orientations are provided at several areas of the key pads.

Referring now to FIG. 10 another aspect of the present invention is being illustrated in accordance with the subject invention, wherein additional display element(s) having various orientation(s) are provided at area(s) of the key pad. The display allows data which has been stored in memory or which is input by the operator using the keypad to be viewed by the operator. The additional display element 92 is mounted upon a side 91 of the key pad 94. Similar elements can be provided on a side(s) of the lower and/or upper terminal housing. Such display assembly provides a user easy access to required information when the hand held scanner needs to be oriented at various angles for a proper reading of the bar code symbol display. At such slanted angles, an otherwise redundant display functions as an effective media for visual representation of information. It is to be appreciated that the other display elements may be mounted on various sides of the terminal housing, as well as the keypad element.

The portable bar code scanner apparatus can read a bar code when a designated key for scanning on the keypad is actuated. When the scan key is pressed, the microprocessor activates the means for scanning a bar code and causes light to be emitted through the transparent window 20 on the upper end of the housing to strike a bar code positioned adjacent thereto. Typically, a laser beam generated by a laser source, for example, a gas laser tube or a semiconductor laser diode, is optically focused by an optical train into a generally circular laser beam spot on a target symbol. The beam spot is swept by a scanning component over the symbol and forms a scan pattern thereon. Thereafter, laser light reflected off the symbol is detected by a light sensor, e.g. a photodiode, mounted together with the laser source, the optical train, the scanning component, and the photodiode of the hand held scanner. Since the photodiode "sees" only that portion of the scan spot visible through the viewing window, in one aspect of the subject invention, the reading performance can be improved by focusing a light beam and the view of a light sensor at a specific angle. This angle is defined in a vertical plane that symmetrical divides the scanner in two halves. Such angle is measured clockwise with its initial side substantially parallel to the handle and its extended side substantially defining the laser beam path, and its vertex positioned within the top housing. In one aspect of the present invention the optimum angle is 2070 (degrees). Acceptable tolerance range for this angle is ±5o(degrees).

Figure 11:
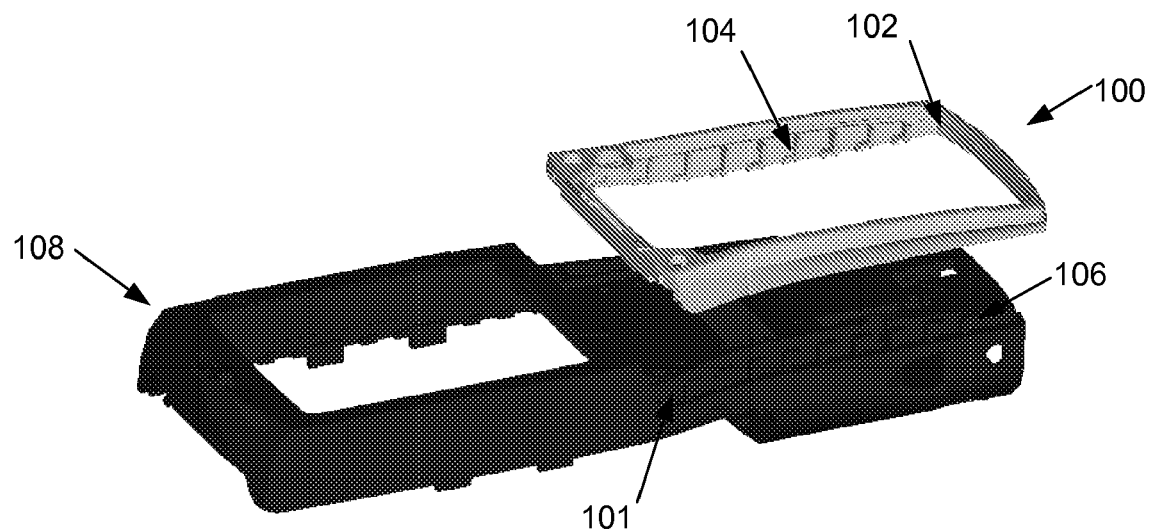
FIG. 11 illustrates a top housing according to one aspect of the subject invention adapted to accept various over sized keypads via a mounting frame.

FIG. 11 illustrates a terminal housing according to one aspect of the subject invention adapted to accept various over sized keypads as part of the scanner by employing a transitional mounting frame 100. The transitional mounting frame 100 can be fabricated from various type of plastic, metals, resilient material or the like. Numerous latch elements 104 are uniformly spread around the perimeter of the sidewalls 102 of the mounting frame 100. Each latch element 104 corresponds to at least one notch and/or aperture 106 formed on a surface perimeter 101 of the top housing 108. As illustrated, the latch 104 can be a substantially L-shaped member, and the notch and/or aperture 106 can be an open notch formed in a side portion of the perimeter of the top housing 108. Alternatively, the notch and/or aperture 106 can be an opening or a slot formed in the transitional mounting frame 100, with the L-shaped member being formed in a side portion of the perimeter 101 of the top housing 108. Accordingly, as the transitional frame 100 is mounted upon and/or within the enclosure 101 of the top housing, the engagement between the L-shaped members 104 and the notches and/or apertures 106 effectively engages the mounting frame 100 with the top housing 108. When the transitional frame 100 is securely in place via the engagement between the latch(es) and the notch(es) and/or aperture(s), a downward force is exerted as to fully secure the transitional frame 100 with the top housing 108. It is to be appreciated that any other suitable mechanism for coupling the mounting frame 100 with the top housing 108 can be employed and is contemplated as falling within the scope of the present invention.

Various a gaskets (not shown), can also be provided as part of such interlocking structure as to seal the engagement perimeter between the mounting frame and the top housing. As such, contamination that might otherwise enter the mobile terminal assembly from outside and thereby affect its performance is reduced. The gasket can be of rubber, foam, or any other elastomer, operable to sufficiently seal the assembly of the mounting frame 100 to the upper housing 108. Such seal assembly mitigates passage of dust and other contaminates into an environment of the mobile terminal.

Figure 12:
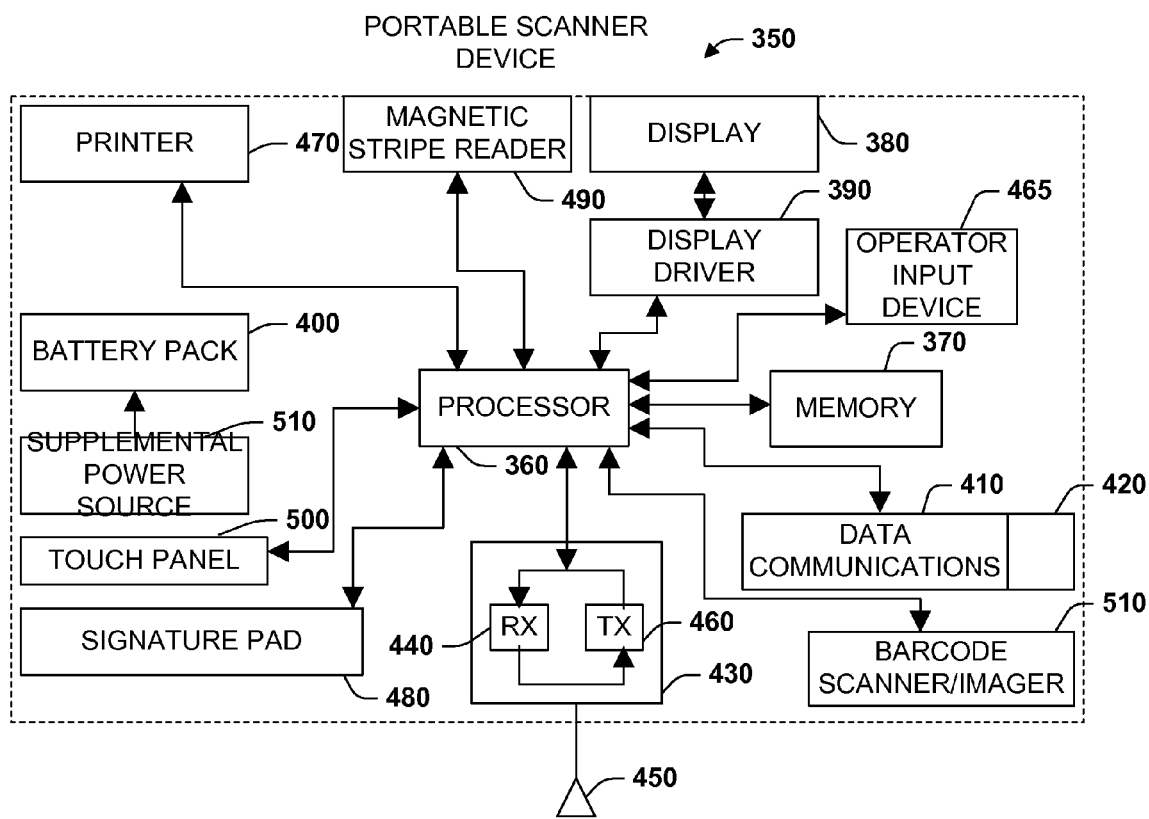
FIG. 12 illustrates a schematic representation for a particular hand held scanner employing a housing according to the present invention.

Turning now to FIG. 12, a schematic representation according to one aspect of the present invention is shown in which a processor 360 is responsible for controlling the general operation of a portable scanner device 350, which employs a terminal housing and key pad as discussed earlier. The processor 360 is programmed to control and operate the various components within the scanner device 350 in order to carry out the various functions described herein. The processor or CPU 360 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can also be employed. The manner the processor 360 can be programmed to carry out the functions relating to the present invention will be readily apparent to those having ordinary skill in the art based on the description provided herein. A memory 370 tied to the processor 360 is also included in the portable scanner device 350 and serves to store program code executed by the processor 360 for carrying out operating functions of the scanner. The memory 370 also serves as a storage medium for temporarily storing information such as receipt transaction information and the like. The memory 370 is adapted to store a complete set of the information to be displayed. According to one particular aspect, the memory 370 has sufficient capacity to store multiple sets of information, and the processor 360 could include a program for alternating or cycling between various sets of display information.

Display(s) 380, which as described earlier can be mounted on a side of the terminal housing and/or key pad, is coupled to the processor 360 via a display driver system 390. The display 380 is operable to display data or other information relating to ordinary operation of the portable scanner 350. For example, the display 380 may display a set of customer information, which is displayed to the operator and may be transmitted over a system backbone (not shown). Additionally, the display 380 may display a variety of functions that control the execution of the portable electronic device 350. The display 380 is capable of displaying both alphanumeric and graphical characters. Furthermore, as explained earlier the display 380 may be a touch screen that is capable of receiving user information as well as displaying information.

Power is provided to the processor 360 and other components forming the portable electronic device 350 by a battery pack 400, which is located in the top housing. In the event that the battery pack 400 fails or becomes disconnected from the portable electronic device 350, a supplemental power source 510 provides power to the processor 360, the supplemental power source 510 being a super capacitor connected electrically in parallel with the battery 400. The hand-held terminal 350 may enter a minimum current draw of sleep mode upon detection of a battery failure.

The portable electronic device 350 includes a communication subsystem 410 that includes a data communication port 420, which is employed to interface the processor 360 with the main computer. The portable electronic device 350 also optionally includes an RF section 430 connected to the processor 360. The RF section 430 includes an RF receiver 440, which receives RF transmissions from the main computer for example via an antenna 450 and demodulates the signal to obtain digital information modulated therein. The RF section 430 also includes an RF transmitter 460 for transmitting information to the main computer, for example, in response to an operator input 465, e.g. via a keypad, or the completion of a transaction. Peripheral devices, such as a printer 470, signature pad 480, magnetic stripe reader 490, touch panel 500, can also be coupled to the portable scanner device 350 through the processor 360.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising".

What is claimed is:

1. An ergonomic mobile terminal comprising:
a housing comprising a top portion and a bottom portion, the top portion includes a detachable user-input device and an accessory compartment comprising a rail support assembly that receives an accessory for the mobile terminal; and
a pistol-grip handle integral with the bottom portion of the housing, the pistol grip housing comprises a cavity that stores a stylus of the mobile terminal, the cavity further comprises sculpted rib formations on an inner surface of the cavity to guide the stylus during insertion.

2. The mobile terminal of claim 1, the rail support assembly further comprising a mounting component that engages the accessory.

3. The mobile terminal of claim 2, the mounting component further comprising sliding rails that guide the accessory entirely into the accessory compartment, the sliding rails having a channel shape.

4. The mobile terminal of claim 1, the rail support assembly further comprising a locking component that secures the accessory within the accessory compartment of the top portion of the housing.

5. The mobile terminal of claim 4, the locking component comprises raised brackets that engage the accessory.

6. The mobile terminal of claim 4, the locking component comprises a spring assembly that seizes the accessory within the accessory compartment.

7. The mobile terminal of claim 4, the locking component located at an exposed opening of the accessory compartment.

8. The mobile terminal of claim 1, the accessory compartment accepts a battery to facilitate efficient battery replacement and to provide the bottom portion and the handle with additional utility space.

9. The mobile terminal of claim 1, the cavity further comprising an exposed opening located on the underside of the pistol-grip handle.

10. The mobile terminal of claim 1, the bottom portion of the housing further comprising an adjustable mass component that lowers the center of gravity of mobile terminal to provide balance against the accessory in the accessory compartment.

11. The mobile terminal of claim 10, the adjustable mass component being positionable according to a preference of a user.

12. The mobile terminal of claim 1 further comprising, a bar code reader held between the top portion and the bottom portion of the housing, the bar code reader being actuated by a trigger located on the pistol-grip handle.

13. The mobile terminal of claim 1, the bottom portion further comprising an external shock isolation assembly, the shock isolation assembly comprises a rubber component insert-molded as part of the bottom portion.

14. The mobile terminal of claim 1, the detachable user-input device engages the top-portion of the housing via an adapter component.

15. The mobile terminal of claim 14, the adapter component accommodates a user-input device having a dimension larger than that of the top-portion of the housing.

16. The mobile terminal of claim 1, the detachable user-input device is a keypad.

17. A method for employing a mobile terminal comprising:
engaging a transitional frame to a top portion of a housing of the mobile terminal, the housing further includes a bottom portion with which a pistol-grip handle is integral, the pistol grip housing comprises a cavity that stores a stylus of the mobile terminal, the cavity further comprises sculpted rib formations on an inner surface of the cavity to guide the stylus during insertion; and
attaching an input device to the transitional frame, the transitional frame couples the input device to the mobile terminal to enable user input, the transitional frame accommodate input devices with dimensions varying from the dimension of the top portion of the housing.

18. The method of claim 17, further comprising:
mounting an accessory on a rail assembly located within an accessory compartment of the top portion;
sliding the accessory into the compartment via rails located on opposite walls of the accessory compartment; and
locking the accessory in the accessory compartment.

19. A mobile terminal comprising:
a housing comprising a top portion and a bottom portion;
an accessory compartment situated in the top portion to accept an accessory, the accessory compartment comprises a rail frame that engages and guides the accessory into the compartment;
a detachable keypad coupled to the top portion of the mobile terminal via an adapter frame, the detachable keypad having one of a smaller width or a larger width than the width of the top portion; and
a handle integrated with the bottom portion having a lobster-tail shape adapted to fit within a palm of a hand comprising a stylus compartment, the handle further comprising a neck grip feature placed on an opposite side from a trigger of the handle.

* * * * *